(12) United States Patent
Bollier et al.

(10) Patent No.: US 12,447,821 B2
(45) Date of Patent: Oct. 21, 2025

(54) DEVICE FOR CONTROLLING MOTION SICKNESS, WHICH IS INTEGRATED INTO A MOTOR VEHICLE

(71) Applicant: NOVARES FRANCE, Clamart (FR)

(72) Inventors: François Bollier, Nice (FR); Christophe Cazes, Versailles (FR)

(73) Assignee: NOVARES FRANCE, Clamart (FR)

( * ) Notice: Subject to any disclaimer, the term of this patent is extended or adjusted under 35 U.S.C. 154(b) by 214 days.

(21) Appl. No.: 17/784,802

(22) PCT Filed: Nov. 17, 2020

(86) PCT No.: PCT/FR2020/052097
§ 371 (c)(1),
(2) Date: Jun. 13, 2022

(87) PCT Pub. No.: WO2021/116549
PCT Pub. Date: Jun. 17, 2021

(65) Prior Publication Data
US 2023/0013174 A1    Jan. 19, 2023

(30) Foreign Application Priority Data
Dec. 13, 2019   (FR) ...................................... 1914358

(51) Int. Cl.
*B60K 35/00*     (2024.01)
*B60K 35/10*     (2024.01)
(Continued)

(52) U.S. Cl.
CPC .............. *B60K 35/00* (2013.01); *B60K 35/10* (2024.01); *B60K 35/60* (2024.01); *B60K 35/65* (2024.01);
(Continued)

(58) Field of Classification Search
CPC .. B60K 35/00; B60K 35/65; B60K 2360/332; B60K 2360/333; B60K 35/656;
(Continued)

(56) References Cited

U.S. PATENT DOCUMENTS

2006/0080004 A1*   4/2006   Cheok .................... G01C 15/14
                                                              701/1
2017/0212633 A1*   7/2017   You ....................... G06F 3/0412
(Continued)

FOREIGN PATENT DOCUMENTS

DE    102006009566 A1    9/2007
DE    102017207788 A1    11/2018
(Continued)

OTHER PUBLICATIONS

English translation of FOR reference FR3048887 (Year: 2017).*
(Continued)

*Primary Examiner* — Tiffany P Young
(74) *Attorney, Agent, or Firm* — CANTOR COLBURN LLP

(57) ABSTRACT

An anti-kinetosis device for a motor vehicle includes a triaxial accelerometer, a display means, and a control unit. The triaxial accelerometer detects accelerations of the vehicle along three axes emits a corresponding acceleration signal. The display means includes light markers forming a first horizontal plane. The control unit includes an acceleration signal input, a processor, and a memory. The control unit receives the acceleration signals emitted by the accelerometer at the acceleration signal input. The memory stores instructions configured to cause the processor to align the first horizontal plane perpendicular to a gravitation vector by driving the means for displaying light markers and configured to cause the processor to align the first horizontal plane with a physical parameter of a first person seated in the
(Continued)

motor vehicle. The first horizontal plane is positioned just beside the first internal surface and just in front of the second internal surface.

20 Claims, 14 Drawing Sheets

(51) Int. Cl.
  *B60K 35/60* (2024.01)
  *B60K 35/65* (2024.01)
(52) U.S. Cl.
  CPC ...... *B60K 35/656* (2024.01); *B60K 2360/143* (2024.01); *B60K 2360/23* (2024.01); *B60K 2360/332* (2024.01); *B60K 2360/333* (2024.01); *B60K 2360/334* (2024.01); *B60K 2360/48* (2024.01); *B60K 2360/741* (2024.01); *B60K 2360/788* (2024.01); *B60W 2420/905* (2013.01)
(58) Field of Classification Search
  CPC ........ B60K 2360/788; B60K 2360/143; B60K 35/10; B60K 35/60; B60K 2360/741; B60K 2360/23; B60K 2360/48; B60K 2360/334; B60W 2420/905
  USPC .......................................................... 701/36
  See application file for complete search history.

(56) References Cited

U.S. PATENT DOCUMENTS

| 2018/0086258 A1* | 3/2018 | Fleurence | ................ B60Q 9/00 |
| 2019/0083739 A1* | 3/2019 | Jeannin | ............... F21V 23/0492 |
| 2021/0402878 A1* | 12/2021 | Hwang | .................. B60K 35/00 |

FOREIGN PATENT DOCUMENTS

| FR | 3048887 A1 * | 9/2017 | ............ A61M 21/00 |
| JP | 2003519810 A | 6/2003 | |
| JP | 2017105336 A | 6/2017 | |
| JP | 2018205429 A | 12/2018 | |
| KR | 20120112003 A | 10/2012 | |
| WO | WO-2020040319 A1 * | 2/2020 | ............. B60K 35/00 |

OTHER PUBLICATIONS

JPO Notice of Reasons for Refusal corresponding to JP Application No. 2022-535780; Mailing Date, Mar. 19, 2024.
International Search Report issued Feb. 17, 2021 re: Application No. PCT/FR2020/052097, pp. 1-3, citing: DE 102017207788 A1, "Accelerometer", DE 102006009566 A1 and US 20170212633 A1.
Wikipedia "Accelerometer", Nov. 10, 2019, pp. 1-5, URL:https://en.wikipedia.org/w/index.php?title=Accelerometer&oldid=925500489, XP002800053.
JPO Notice of Reasons for Refusal corresponding to JP Application No. 2022-535780; Issue Date, Sep. 6, 2024, 10 pages.

* cited by examiner

DEVICE FOR CONTROLLING MOTION SICKNESS, WHICH IS INTEGRATED INTO A MOTOR VEHICLE

TECHNICAL FIELD

The disclosure concerns a device intended to combat the kinetosis integrated in a motor vehicle and a motor vehicle equipped with said device.

BACKGROUND

A common problem experienced by people traveling in a vehicle, plane or boat is motion sickness, also known as kinetosis. Motion sickness is caused by a mismatch between the sensations experienced in the vestibular system of the internal ear and those experienced by other senses, such as person visual perceptions. Balance receptors in the internal ear are sensitive to gravity (for example, changes in orientation), speed, and changes in velocity (accelerations) that occur as the vehicle is displaced. When the sensations felt by the internal ear do not correspond to the visual signals perceived by the person, it often results in motion sickness for the person, manifesting in particular in the form of nausea and headaches.

For example, a passenger traveling on a winding road in a motor vehicle experiences linear and angular accelerations each time the vehicle is displaced through a curve. The vestibular sensing system response to acceleration caused by vehicle motion will not match visual perception unless the person is continuously looking down the road, so their internal ear perception matches the vehicle path perceived visually in curves. It is for this reason that the driver of a vehicle does not usually suffer from motion sickness, while the passengers of the vehicle can suffer from it. Indeed, the driver constantly watches the road and visually perceives the movement of the vehicle so that the visual perceptions correspond to the senses of the internal ear. Conversely, the passengers of a vehicle who read or look only inside the vehicle or engage in other activities that prevent them from watching the road will have a visual perception that does not match that of their internal ear.

To avoid motion sickness, one solution is therefore for the passenger to watch the road as if he were driving the vehicle, so that the visual information he receives corresponds more closely to the sensations of his vestibular system. However, when seated in the back of the vehicle, he usually partially sees the road. The actual movement of the passenger perceived by the internal auditory apparatus of the vestibular ear cannot therefore be easily associated with the visual perception of this movement. Motion sickness cannot therefore be avoided in this case.

Another solution to motion sickness, described in document US 2019/0083739, consists in using light markers in the internal uprights of a vehicle passenger compartment, said light markers forming light columns on each side of the passenger compartment. The height of the light columns is controlled by electronic command means so as to create an artificial horizon corresponding to the perception of the internal ear of a passenger seated in the vehicle. Nonetheless, this solution has the drawback of defining an artificial horizon which does not take into account the size of the passengers and their position in the passenger compartment. Thus, in this known solution, a young child may have difficulty seeing the artificial horizon if the latter is positioned above his eyes. Similarly, a tall person will find it difficult to see the artificial horizon if their eyes are above the highest light marks of the light columns. Moreover, this known solution only makes it possible to create a single artificial horizon in the passenger compartment. Yet, in the case where two people of different heights are seated side by side at the rear of the vehicle, it would be desirable to define two artificial horizons at two different heights, each of the artificial horizons being specifically assigned to one of the people.

SUMMARY

The disclosure therefore aims to provide a device intended to combat kinetosis integrated into a motor vehicle and not having the drawbacks of the aforementioned prior art.

To this end, the disclosure concerns an anti-kinetosis device fitted to a motor vehicle, the anti-kinetosis device comprising:
  a triaxial accelerometer configured to detect the accelerations of the vehicle along 3 axes and to emit a corresponding acceleration signal;
  means for displaying light markers capable of forming at least one first artificial horizon line at a first internal surface of the motor vehicle and at least one second artificial horizon line at a second internal surface of the motor vehicle, said first and second artificial horizon lines being perpendicular or substantially perpendicular to each other;
  a control unit able to receive the acceleration signals emitted by the accelerometer and to drive said display means so that the first and second artificial horizon lines are aligned in a horizontal, perpendicular or substantially perpendicular plane to the gravitation vector, whatever the accelerations of the vehicle, the position of said horizontal plane along a direction parallel to the gravitation vector being able to vary according to a physical parameter linked to the person seated in the motor vehicle by being positioned just beside the first internal surface and just in front of the second internal surface.

Thus configured, the anti-kinetosis device of the disclosure makes it possible to eliminate motion sickness by displaying two artificial horizon lines, respectively one in front of a person seated in the vehicle and the other beside said person, said lines being aligned in a horizontal plane. The device also makes it possible to vary the height of the lines as a function of a physical parameter linked to the person.

The device of the disclosure may also comprise one or more of the following characteristics:
  the physical parameter is the height of the person, in a seated position in the vehicle.
  the control unit is capable of modifying the position of the horizontal plane defined by the first and second artificial horizon lines in response to a command entered manually by one of the occupants of the vehicle by means of a command interface.
  the command interface is integrated into the dashboard of the vehicle.
  the command interface is integrated in a central upright of the vehicle.
  the command interface comprises an external surface functionally linked to detection means of the capacitive type, said detection means being able to detect the contact of a finger on said external surface and to transmit a corresponding signal to the control unit.

the control unit is capable of automatically modifying the position of the horizontal plane defined by the first and second lines of the artificial horizon in response to a signal emitted by a sensor configured to detect at least one physical parameter, in particular the position of the eyes, of the person seated just beside the first internal surface and just in front of the second internal surface.

the sensor is selected among a camera, an ultrasound sensor, a radiofrequency sensor and a weight measurement sensor positioned in one of the seats of the vehicle.

the display means are capable of emitting at least two light beams of a rectilinear shape, respectively a first light beam projected onto the first internal surface and forming the first artificial horizon line, and a second light beam projected onto the second internal surface and forming the second artificial horizon line.

the display means comprise at least one light source emitting a main light beam, and means for separating and deflecting said main light beam into two secondary light beams.

the separation and deflection means comprise a prism intended to separate the light beam into two secondary light beams and a combination of mirrors and/or lenses intended to modify the path of said secondary light beams.

the display means comprise at least one pair of light sources, respectively a first light source emitting the first light beam and a second light source emitting the second light beam.

the light source, respectively the pair of light sources, is a laser, respectively a pair of lasers.

the display means comprise at least three light columns oriented vertically, respectively a first light column arranged in alignment with the first internal surface and in alignment with the second internal surface, a second light column arranged in alignment with the second internal surface and to the left or right of the first light column, and a third light column disposed in alignment with the first internal surface and closer to the rear of the vehicle than the first light column, each of the columns being formed of a plurality of light points aligned in the vertical direction, each of the light points being able to emit light in an activated state and not emit light in an deactivated state, and in that the first artificial horizon line is formed by the virtual line passing through the highest or lowest activated light points on the first and third light columns respectively and the second artificial horizon line is formed by the virtual straight line passing through the highest, or lowest activated light points, on the first and second light columns respectively.

each of the light columns comprises a linear array of vertically lined light-emitting diodes, each of the light-emitting diodes forming a light point.

The disclosure also concerns a motor vehicle equipped with the anti-kinetosis device as defined above.

In a particular configuration of the disclosure, the vehicle comprises at least one central upright, said central upright supporting the display means, said display means being configured to project the first light beam onto a rear lateral window or a rear door panel of the vehicle and for projecting the second light beam onto an internal surface of the passenger compartment arranged substantially perpendicular to said window or to said door panel, for example the backrest of one of the front seats of the vehicle.

In another particular configuration of the disclosure, the display means are displaceable along the central upright so as to allow adjustment of the height of the artificial horizon lines relative to a fixed horizontal plane.

The disclosure also concerns a method for displaying light markers intended to combat kinetosis, comprising the following steps of:

detecting the accelerations of a motor vehicle along 3 axes and sending corresponding signals to a control unit;

detecting a physical parameter related to the person seated in the motor vehicle and sending a corresponding signal to the control unit;

driving by the control unit of means for displaying light markers capable of forming at least one first artificial horizon line at the level of a first internal surface of the motor vehicle and at least one second artificial horizon line at the level of a second internal surface of the motor vehicle, said first and second artificial horizon lines being perpendicular or substantially perpendicular to each other, such that the first and second artificial horizon lines are aligned in a horizontal plane, perpendicular to the gravitation vector, whatever the accelerations of the vehicle, the position of said horizontal plane along a direction parallel to the gravitation vector being able to vary according to the detected physical parameter.

BRIEF DESCRIPTION OF THE DRAWINGS

Other features and advantages will become apparent from the description below of two particular embodiments of the disclosure, given by way of non-limiting examples, with reference to the appended drawings in which.

DETAILED DESCRIPTION OF THE DRAWINGS

Figure 1:
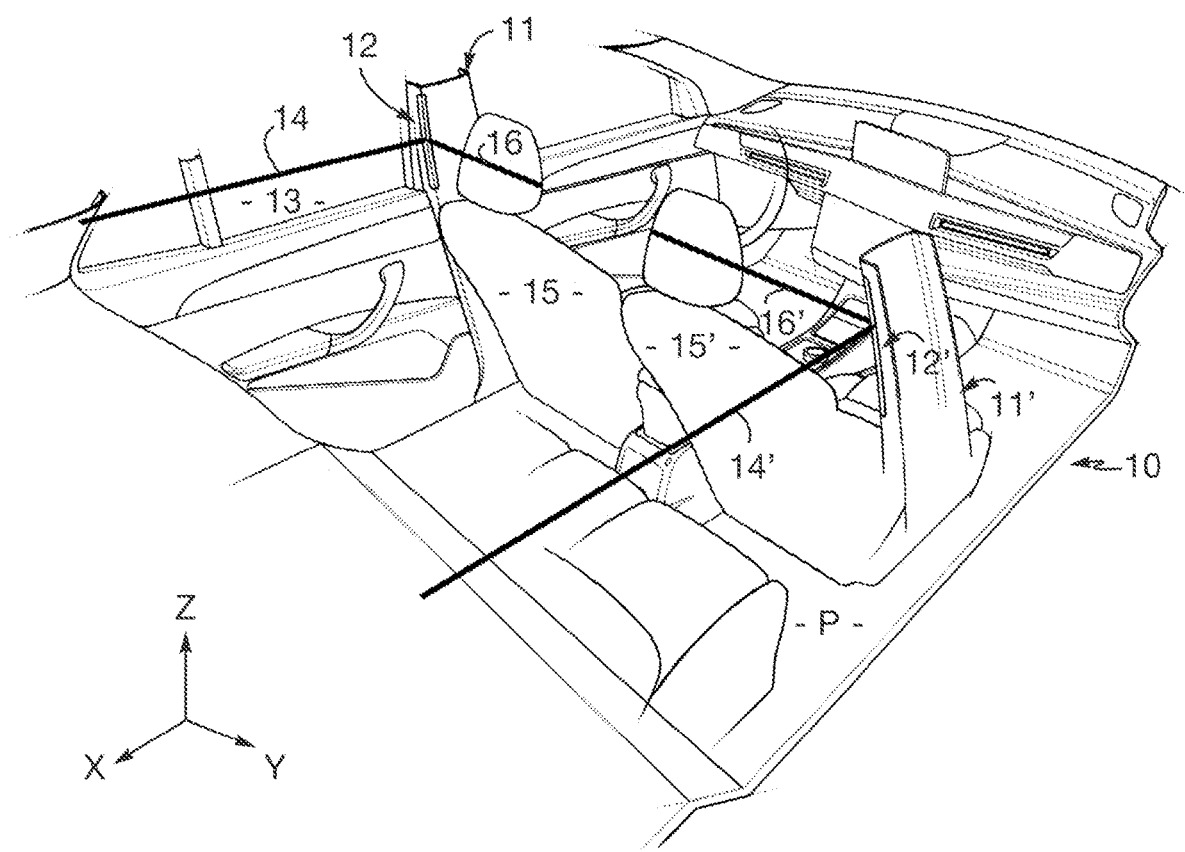
FIG. 1 is a perspective view from the rear of the passenger compartment of a vehicle according to a first embodiment of the disclosure and according to a first operating mode of the anti-kinetosis device, the vehicle not being subjected to any acceleration.
Figure 7:
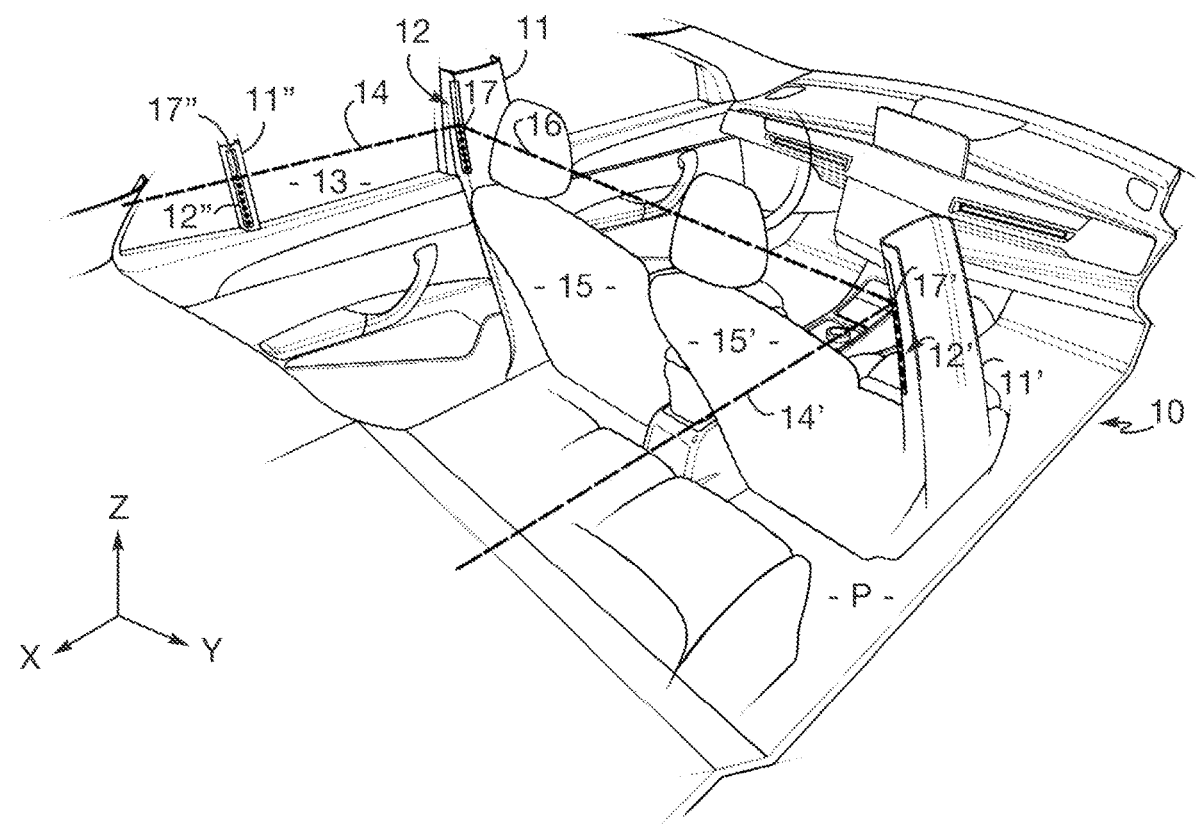
FIG. 7 is a perspective view of the passenger compartment of a vehicle according to a second embodiment of the disclosure, the vehicle not being subjected to any acceleration.

In the remainder of this description, and with reference to the Cartesian coordinate system XYZ shown in FIGS. 1 and 7, the terms «longitudinal direction» will be used for a direction along the X axis, «transverse direction» for a direction along the Y axis and «vertical direction» for a direction along the Z axis. Moreover, conventionally, the term «front» will be used to indicate an orientation directed towards the front of the vehicle and the term «rear» will be used to indicate an orientation directed towards the rear of the vehicle.

With reference to FIG. 1, there is shown a passenger compartment of a vehicle 10 according to a first embodiment of the disclosure. In this embodiment, a first lighting column 12 oriented vertically is supported by a central upright 11 of the vehicle and is arranged on the left side with respect to the field of view of a passenger sitting at the rear of the vehicle, and a second lighting column 12' oriented vertically is supported by another central upright 11' of the vehicle and is arranged on the right side with respect to the field of view of a passenger sitting in the back of the vehicle. Each lighting column 12, 12' comprises at least one light source configured to project a first rectilinear light beam onto a rear lateral window or a rear door panel 13 of the vehicle and to project a second rectilinear light beam onto the backrest of one of the front seats 15 or 15' of the vehicle. The first light beam emitted by the first lighting column 12 projects onto the rear lateral window or the rear door panel 13 directly adjacent to the first lighting column 12 along a first line 14, subsequently referenced as the first artificial horizon line, and the second light beam emitted by the first lighting column 12 projects onto the backrest of the front seat 15 directly adjacent to the first lighting column 12 along a second line 16, subsequently referenced as the second artificial horizon line. Similarly, the first light beam emitted by the second lighting column 12' projects onto the rear lateral window or the rear door panel (not shown) directly adjacent to the second lighting column 12' along a first line 14', subsequently referred to as the first artificial horizon line, and the second light beam emitted by the second lighting column 12' projects onto the backrest of the front seat 15' directly adjacent to the second lighting column 12' along a second line 16', subsequently referenced as the second artificial horizon line. In this configuration, the first and second artificial horizon lines are perpendicular or substantially perpendicular to each other.

By suitably driving the light source(s), it is thus possible to align the first and second artificial horizon lines 14, 16 and 14', 16' in a horizontal plane A which is always perpendicular to the gravitation vector. Thus, a person seated next to the rear lateral window 13 and behind the front seat 15 and fixing said artificial horizon lines 14, 16 will have the same visual sensations as the driver looking at the road: he will therefore no longer be subject to motion sickness. To achieve this result, the vehicle 10 is advantageously equipped with a triaxial accelerometer configured to detect the accelerations of the vehicle along the 3 axes X, Y and Z and emit corresponding acceleration signals, and a control unit able to receive the acceleration signals emitted by the accelerometer and to drive the light source(s) so that the first and second artificial horizon lines 14, 16 and 14', 16' are aligned in a horizontal plane A, perpendicular to the gravitation vector, whatever the accelerations of the vehicle. By way of example, the control unit can be a processor or computer equivalent including a memory configured to cause a processor to perform corresponding functions.

FIGS. 1, 1a, 1b, 3 to 6, 3a to 6a and 3b to 6b illustrate several possible driving conditions and the corresponding operation of the anti-kinetosis device fitted to the vehicle of the disclosure.

Figure 1A:
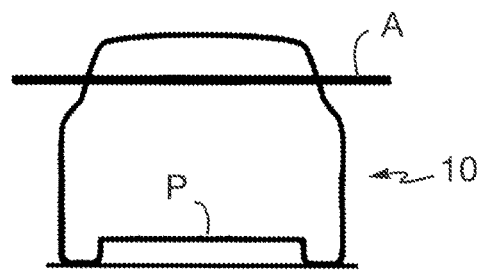
FIG. 1a is a rear view of the vehicle shown in FIG. 1.
Figure 1B:
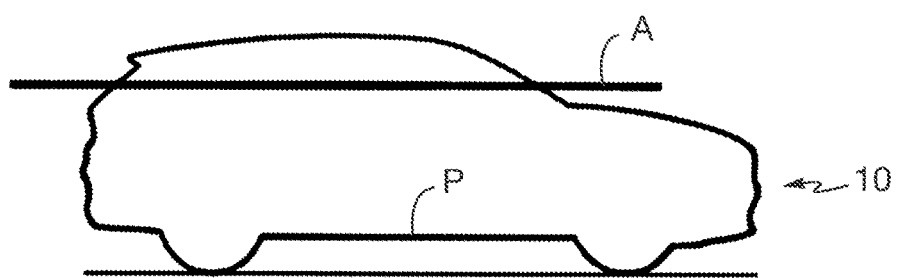
FIG. 1b is a lateral view of the vehicle shown in FIG. 1.

Thus, in the case where the vehicle 10 travels on a flat road, as shown in FIGS. 1a and 1b, it is not subject in principle to any acceleration. In this case, the plane A defined by the artificial horizon lines 14, 16 and 14', 16' is parallel to the floor pan P of the vehicle.

Figure 3:
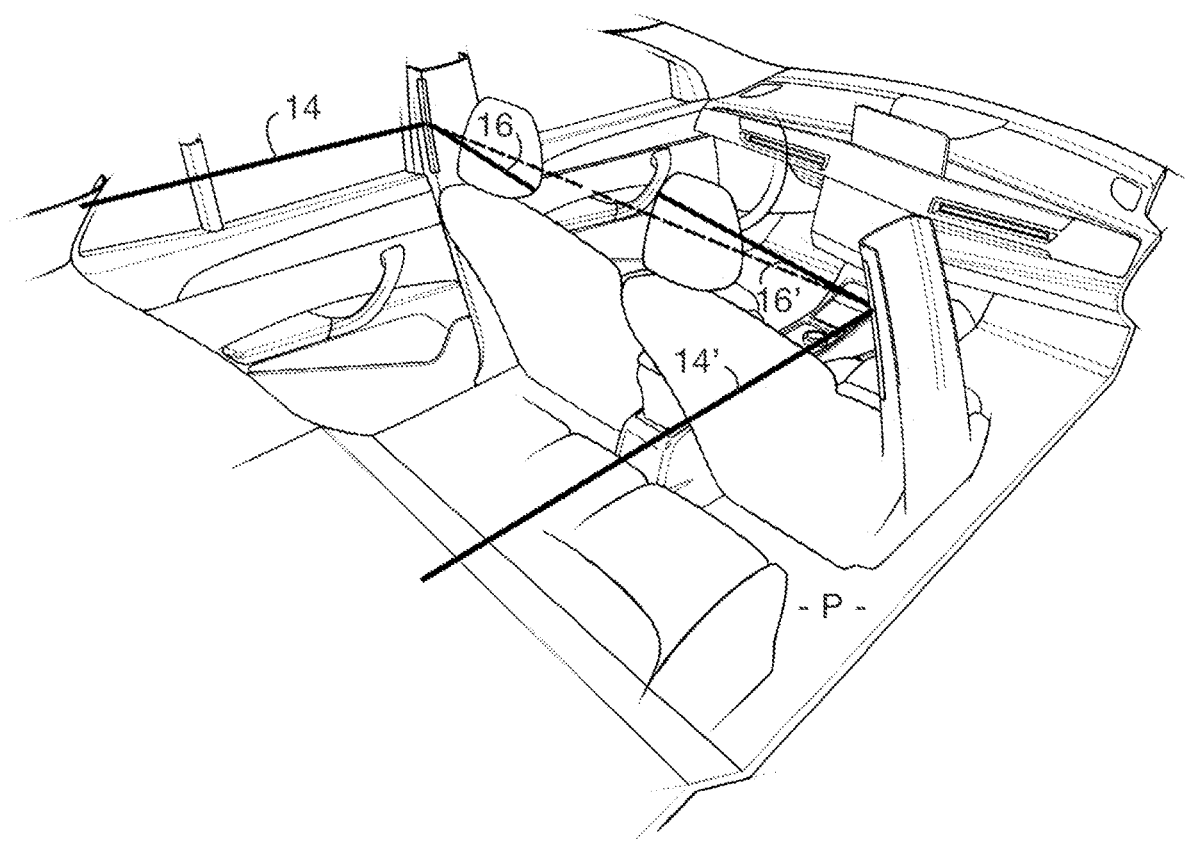
FIG. 3 is a view similar to FIG. 1, the vehicle being subjected to an acceleration along the Y axis.
Figure 3A:
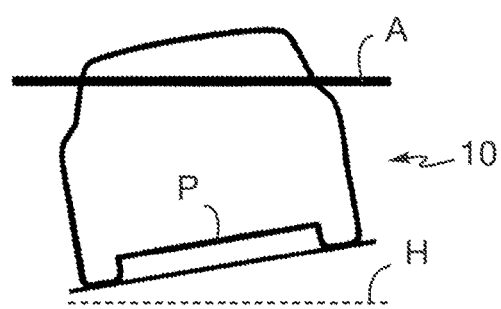
FIG. 3a is a rear view of the vehicle shown in FIG. 3.
Figure 3B:
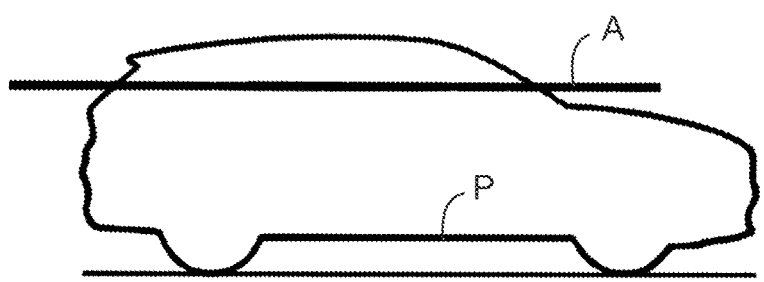
FIG. 3b is a lateral view of the vehicle shown in FIG. 3.

In the case where the vehicle 10 is traveling on a road inclined to the left with respect to a fixed horizontal plane H, perpendicular to the gravitation vector, as represented in FIGS. 3a and 3b, it is subjected to an acceleration along the Y axis. This acceleration is detected by the triaxial accelerometer, which sends a corresponding acceleration signal to the control unit. In response to this acceleration signal, the control unit controls the corresponding light sources of the first and second lighting columns 12, 12' so as to align the light beams emitted by said light sources with the fixed horizontal plane H. In this case, the plane A defined by the artificial horizon lines 14, 16 and 14', 16' is inclined with respect to the floor pan P of the vehicle at the level of the Y axis, as shown in FIG. 3.

Figure 4:
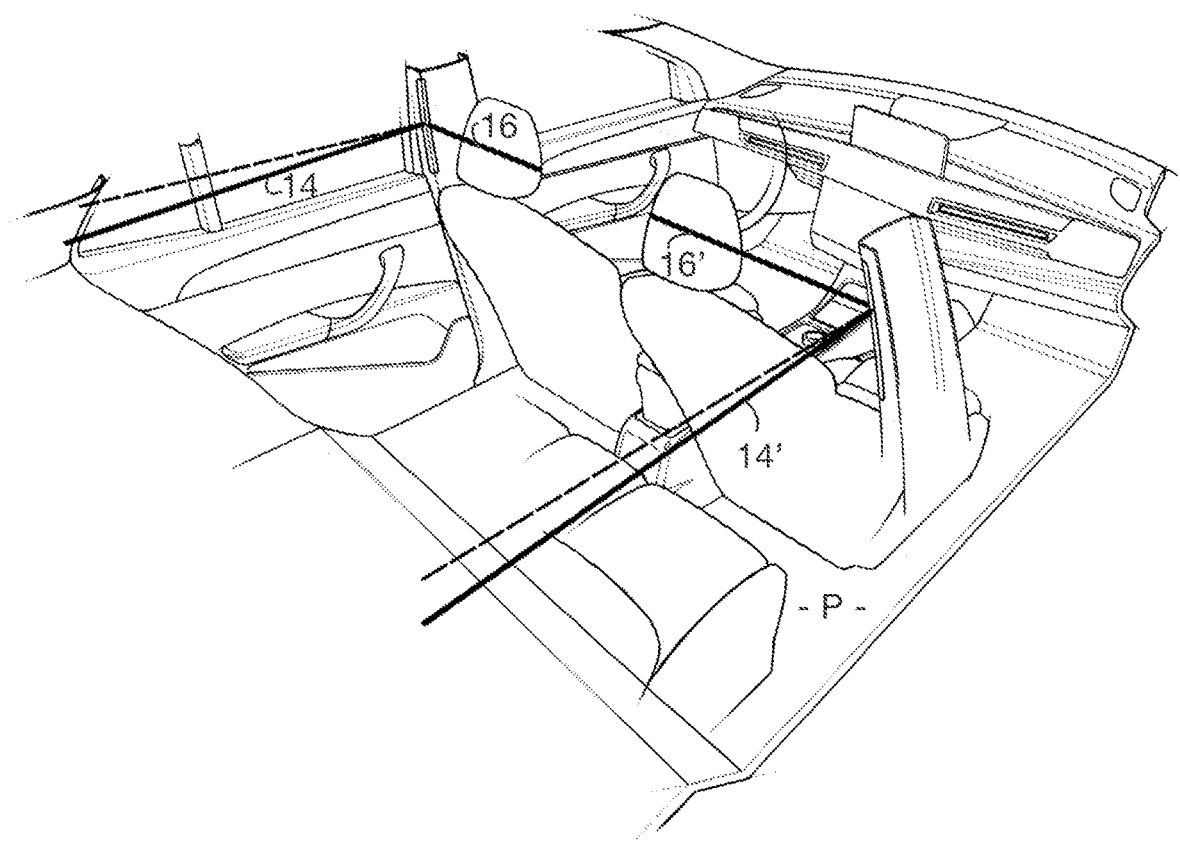
FIG. 4 is a view similar to FIG. 1, the vehicle being subjected to an acceleration along the X axis.
Figure 4A:
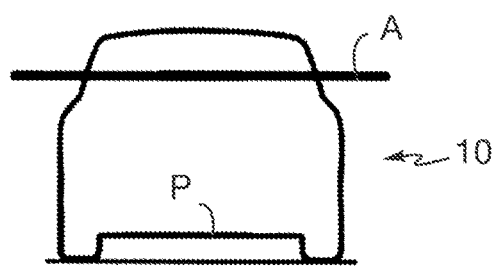
FIG. 4a is a rear view of the vehicle shown in FIG. 4.
Figure 4B:
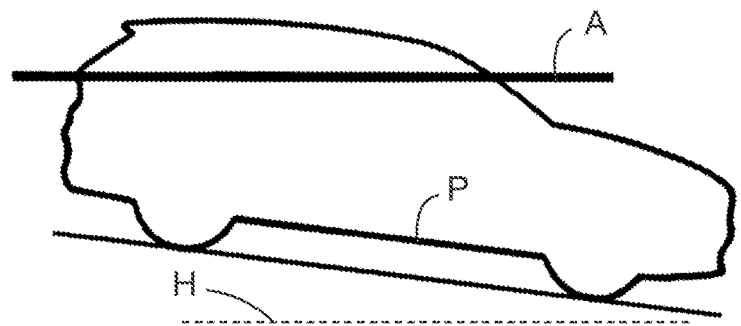
FIG. 4b is a lateral view of the vehicle shown in FIG. 4.

In the case where the vehicle 10 is traveling on a road inclined downwards with respect to a fixed horizontal plane H, perpendicular to the gravitation vector, as shown in FIGS. 4a and 4b, it is subjected to an acceleration along the X axis. This acceleration is detected by the triaxial accelerometer, which sends an acceleration signal corresponding to the control unit. In response to this acceleration signal, the control unit controls the corresponding light sources of the first and second lighting columns 12, 12' so as to align the light beams emitted by said light sources with the fixed horizontal plane H. In this case, the plane A defined by the artificial horizon lines 14, 16 and 14', 16' is inclined with respect to the floor pan P of the vehicle at the level of the X axis, as shown in FIG. 4.

Figure 5:
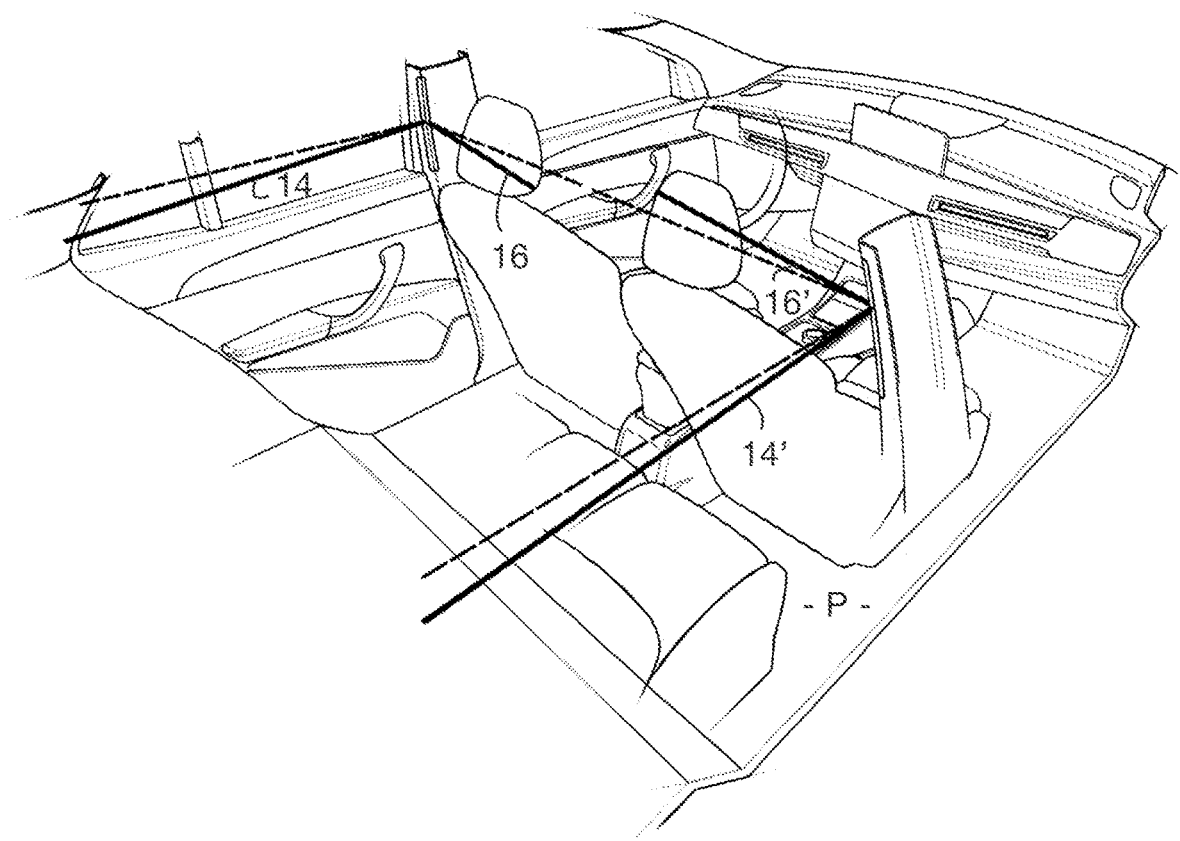
FIG. 5 is a view similar to FIG. 1, the vehicle being subjected to an acceleration along the X axis and along the Y axis.
Figure 5A:
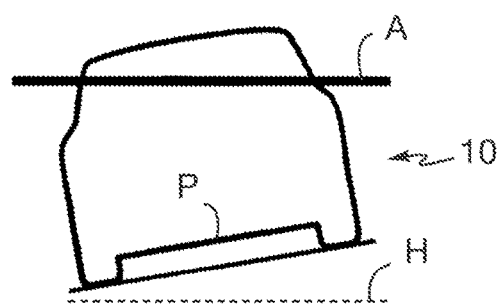
FIG. 5a is a rear view of the vehicle shown in FIG. 5.
Figure 5B:
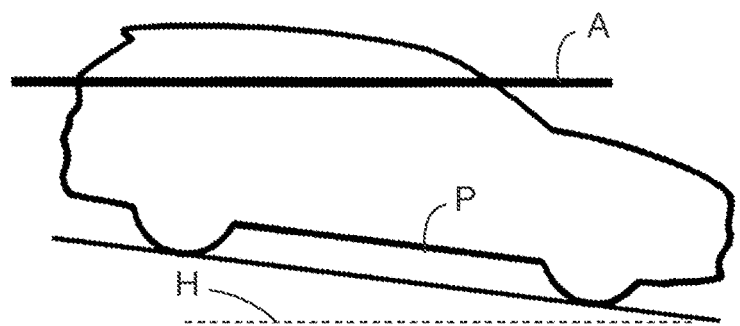
FIG. 5b is a lateral view of the vehicle shown in FIG. 5.

In the case where the vehicle 10 is traveling on a road inclined to the left and downwards with respect to a fixed horizontal plane H, perpendicular to the gravitation vector, as represented in FIGS. 5a and 5b, it is subjected to an acceleration according to the X axis and along the Y axis.

This acceleration is detected by the triaxial accelerometer, which sends a corresponding acceleration signal to the control unit. In response to this acceleration signal, the control unit controls the corresponding light sources of the first and second lighting columns 12, 12' so as to align the light beams emitted by said light sources with the fixed horizontal plane H. In this case, the plane A defined by the artificial horizon lines 14, 16 and 14', 16' is inclined with respect to the floor pan P of the vehicle at the level of the axes X and Y, as shown in FIG. 5.

Figure 6:
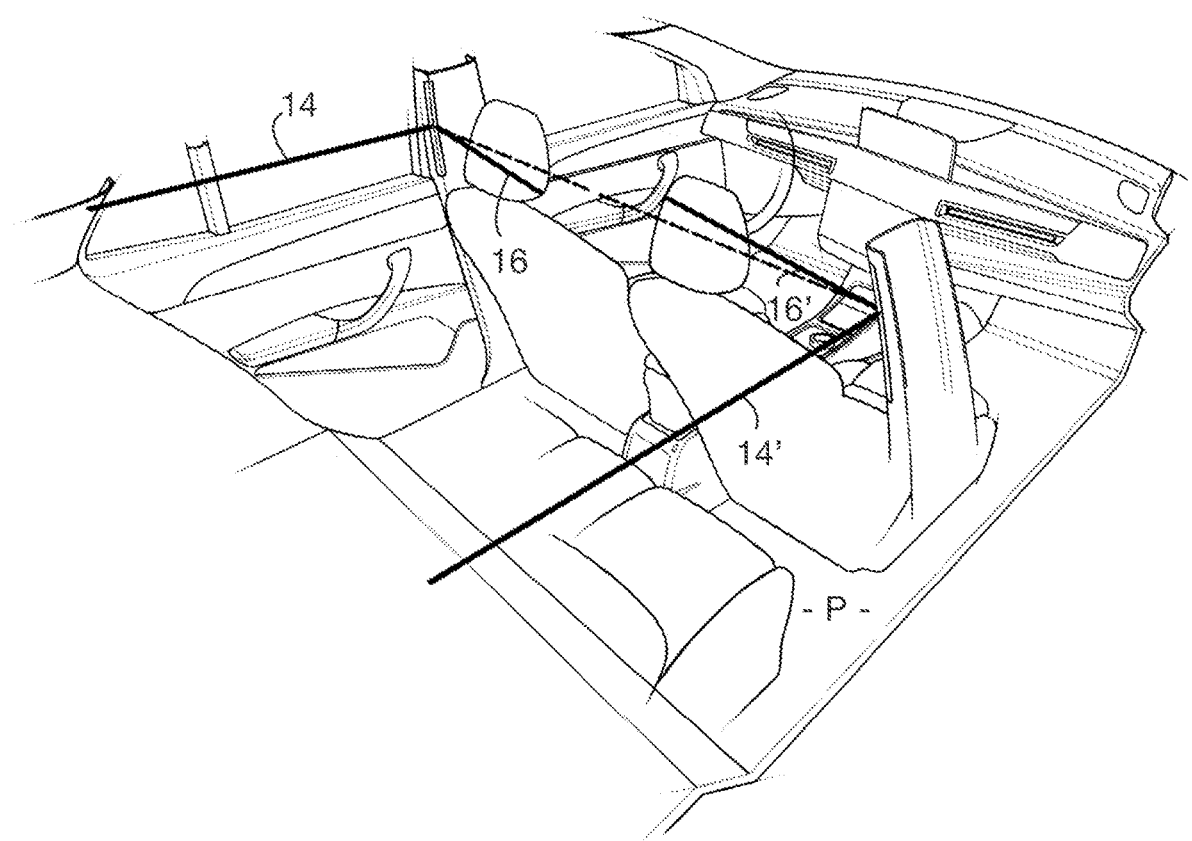
FIG. 6 is a view similar to FIG. 1, the vehicle being subjected to an acceleration along the Y axis.
Figure 6A:
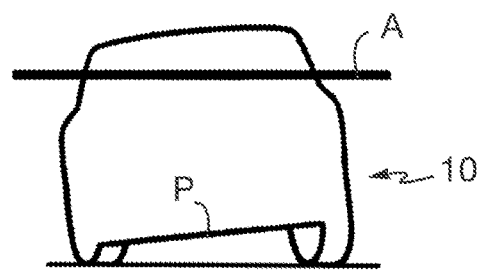
FIG. 6a is a rear view of the vehicle shown in FIG. 6.
Figure 6B:
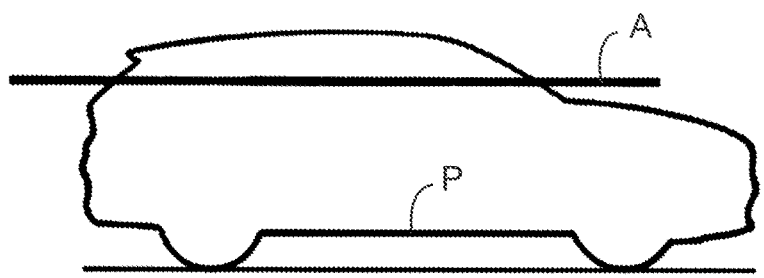
FIG. 6b is a lateral view of the vehicle shown in FIG. 6.

In the case where the vehicle 10 is traveling on a flat road and makes a left turn, as represented in FIGS. 6*a* and 6*b*, it is subjected to an acceleration along the Y axis. This acceleration is detected by the triaxial accelerometer, which sends a corresponding acceleration signal to the control unit. In response to this acceleration signal, the control unit controls the corresponding light sources of the first and second lighting columns 12, 12' so as to align the light beams emitted by said light sources with the fixed horizontal plane H. In this case, the plane A defined by the artificial horizon lines 14, 16 and 14', 16' is inclined with respect to the floor pan P of the vehicle at the level of the Y axis, as shown in FIG. 6.

The light beams from each of the lighting columns 12, 12' may be generated by two separate light sources, or by a single light source emitting a main light beam, said main light beam being subsequently separated and deflected into two secondary light beams by separation and deflection means. Said separation and deflection means may for example consist of a prism intended to separate the light beam into two secondary light beams and of a combination of mirrors and/or lenses intended to modify the path of said secondary light beams.

Figure 2:
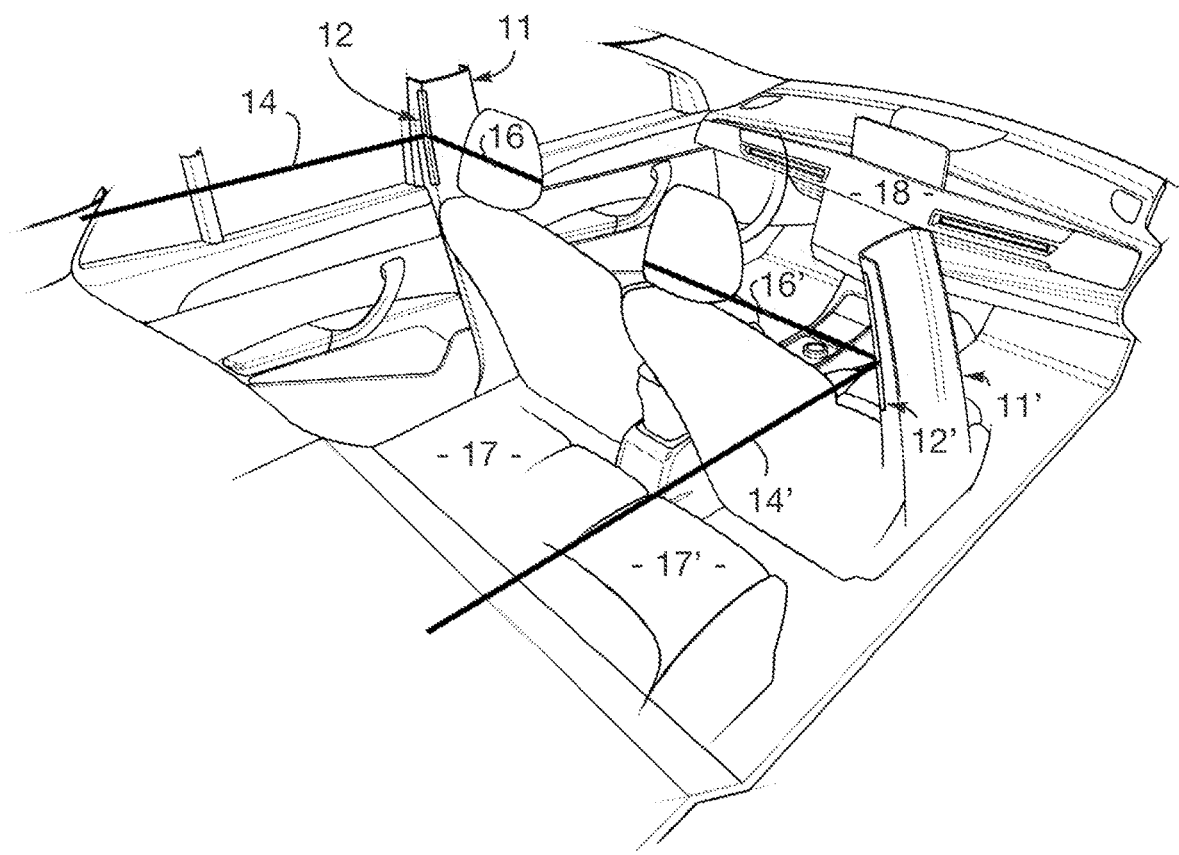
FIG. 2 is a view similar to FIG. 1, in a second operating mode of the anti-kinetosis device.
Figure 2A:
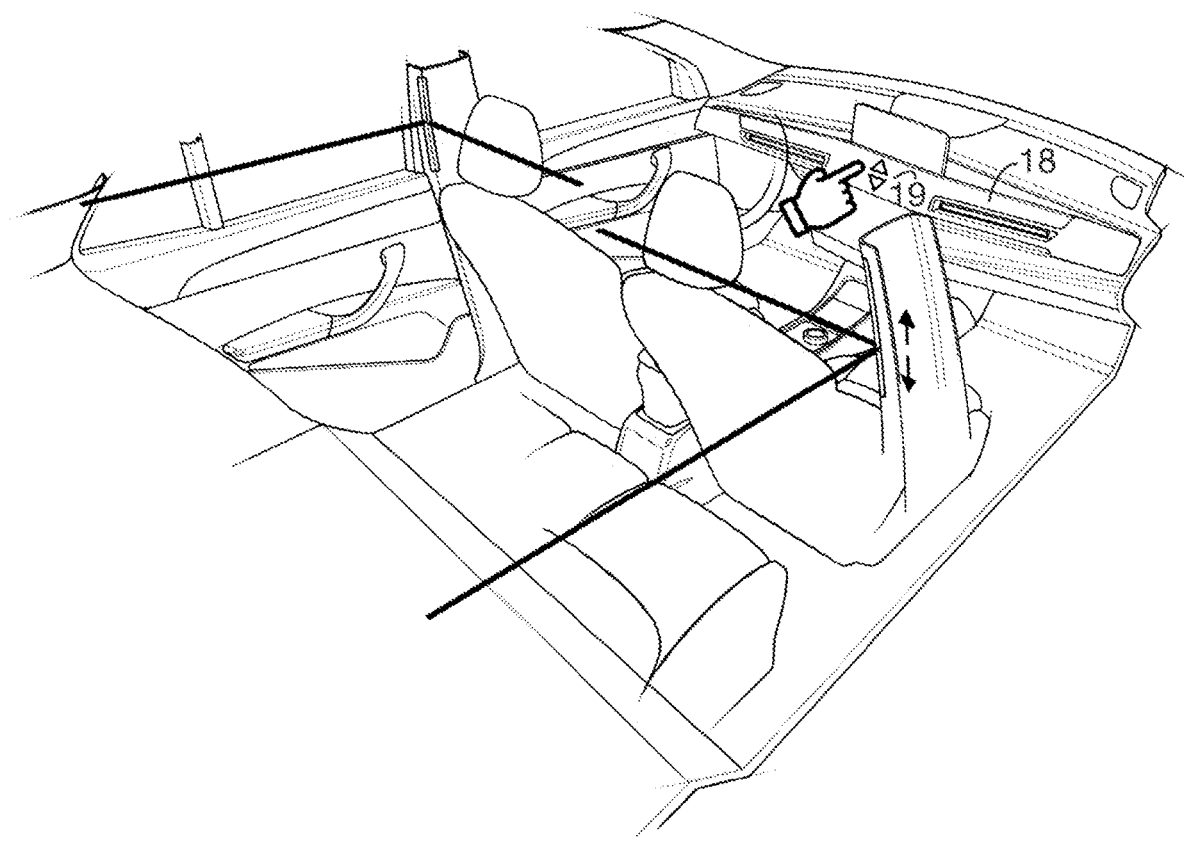
FIG. 2a is a view similar to FIG. 2, in which a first example of a command interface is shown.
Figure 2B:
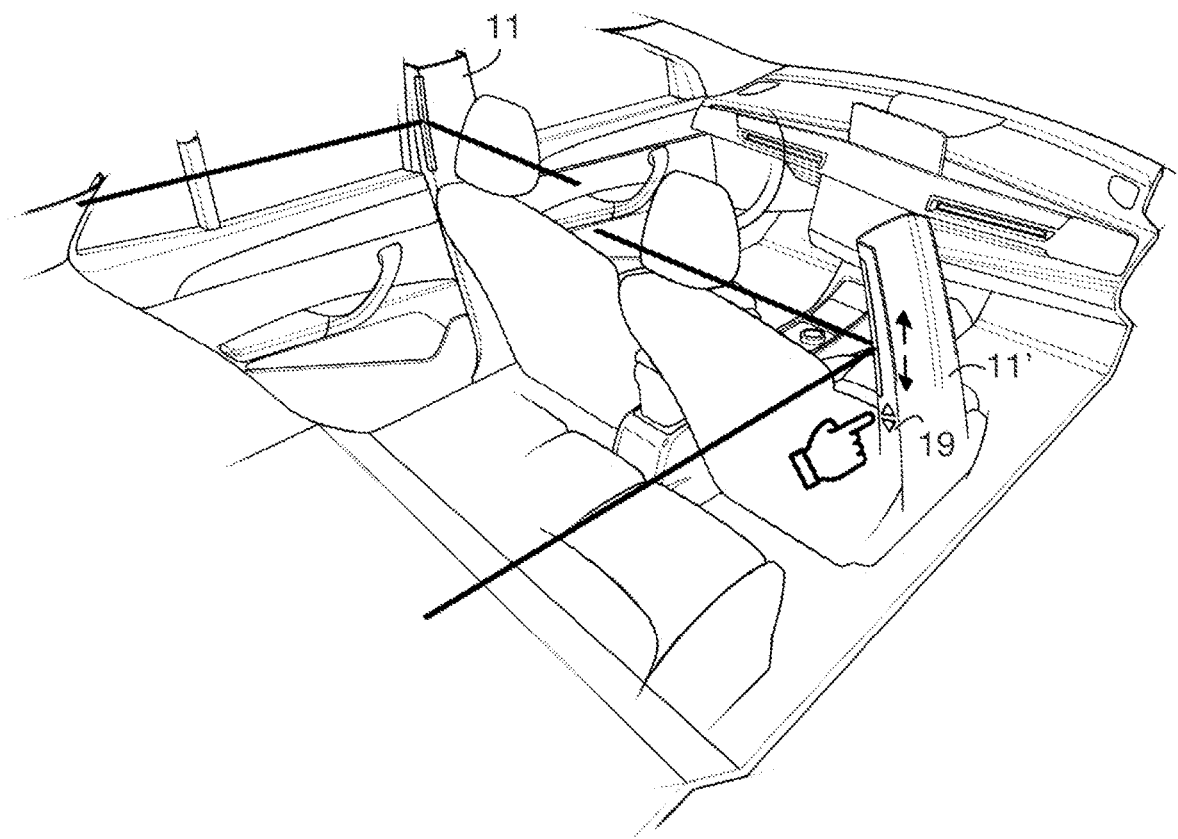
FIG. 2b is a view similar to FIG. 2, in which a second example of a command interface is shown.
Figure 2C:
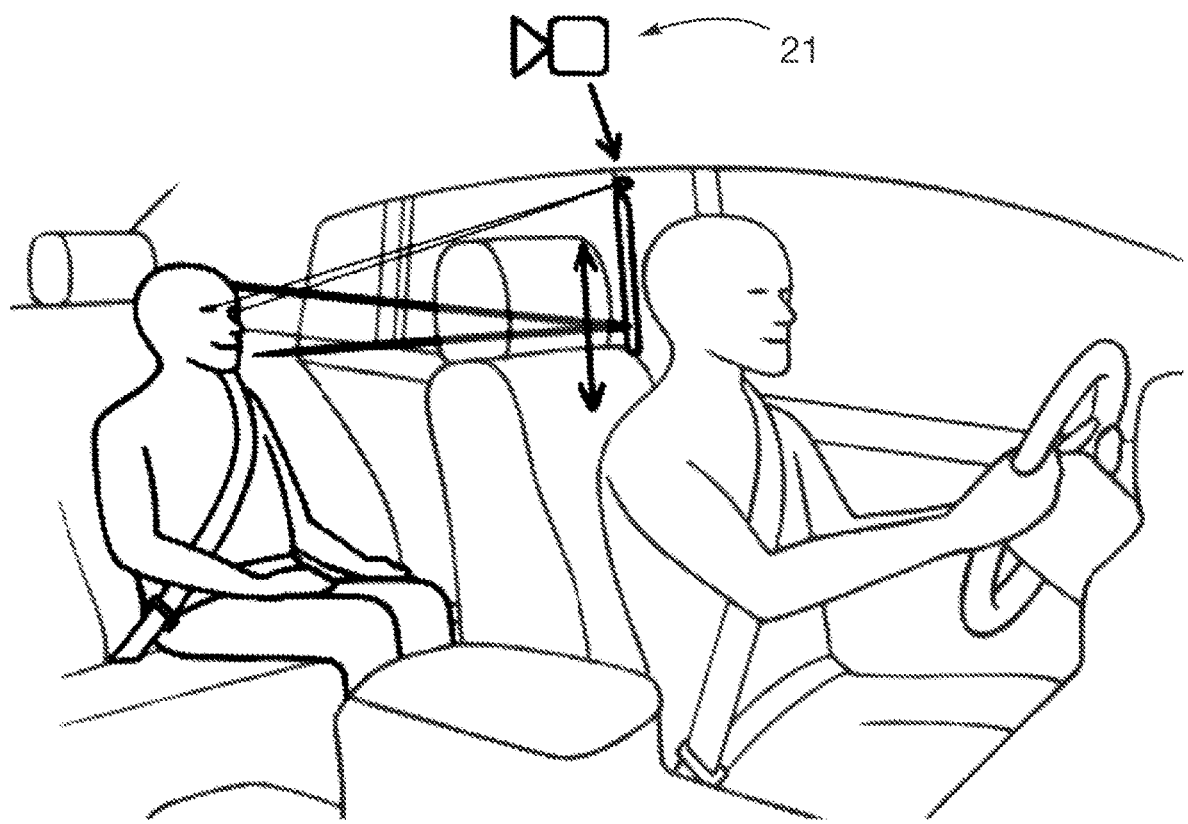
FIG. 2c is a perspective view from the front of the passenger compartment of the vehicle shown in FIG. 1, in which an example of a sensor is shown.

The light source(s) can advantageously be displaced along each of the lighting columns 12, 12' so as to modify the height of the artificial horizon lines 14, 16 and 14', 16' with respect to a fixed horizontal plane. Thus, and as shown in FIG. 2, the position of the light source(s) along the first lighting column 12 could for example be higher than the position of the light source(s) along the second lighting column 12'. This configuration is particularly suitable if the person seated in the left rear seat 17 is taller than the person seated in the right rear seat 17'. This modification of the position of the light source(s) along the lighting column 12, 12' can be done using displacement means controlled by the control unit and in response to a command entered manually by one of the occupants of the vehicle by means of a command interface 19, which can be integrated for example in the dashboard 18, as illustrated in FIG. 2*a*, or in the central upright(s) 11, 11' of the vehicle, as illustrated in FIG. 2*b*. A command interface usable at this level may comprise an external surface functionally linked to detection means of the capacitive type, said detection means being able to detect the contact of a finger on said external surface and to transmit a corresponding signal to the control unit. In another possible configuration, the displacement of the light source(s) along one of the lighting columns 12, 12' could be carried out automatically in response to a signal emitted by a sensor configured to detect at least one physical parameter, in particular the size or position of the eyes, of the person seated closest to the lighting column. The sensor could for example be a camera 21, as shown in FIG. 2*c*, an ultrasonic sensor, a radiofrequency sensor or a weight measuring sensor integrated in one of the vehicle seats.

With reference to FIG. 7, there is shown a passenger compartment of a vehicle according to a second embodiment of the disclosure. In this embodiment, the anti-kinetosis device comprises at least three light columns oriented vertically, respectively a first light column 12 which is supported by a central upright 11 of the vehicle and which is arranged on the left side with respect to the field of view of a passenger seated at the rear of the vehicle, a second light column 12' which is supported by another central upright 11' of the vehicle and which is arranged on the right side with respect to the field of view of a passenger seated at the rear of the vehicle, and a third light column 12" which is supported by a lateral upright 11" forming part of a rear lateral window or a rear door panel 13 and on the left side with respect to the field of view of a passenger seated in the rear of the vehicle. Each light column 12, 12', 12" is formed by a plurality of light points aligned in the vertical direction, each of the light points being able to emit light in an activated state and not emit light in a deactivated state. Thus, a first artificial horizon line 14 is formed by the virtual straight line passing through the highest activated light points 17 and 17" on the first and third light columns 12, 12" respectively, and a second artificial horizon line 16 is formed by the virtual line passing through the highest activated light points 17 and 17' on the first and second light columns 12, 12' respectively. In this configuration, the first and second artificial horizon lines 14, 16 are perpendicular or substantially perpendicular to each other. In an advantageous variant of the disclosure, each of the light columns 12, 12' and 12" may comprise, for example, a linear network of vertically lined light-emitting diodes, each of the light-emitting diodes forming one of the light points of the light columns. In another configuration of the disclosure, the light points can be activated starting from the top of each light column. In this case, the first artificial horizon line 14 will be formed by the virtual straight line passing through the lowest activated light points on the first and third light columns 12, 12" respectively, and the second artificial horizon line 16 will be formed by the virtual straight line passing through the lowest activated light points on the first and second light columns 12, 12' respectively. Moreover, the vehicle 10 may advantageously comprise a fourth light column (not shown) which will be supported by a lateral upright forming part of a rear lateral window or of a rear door panel and on the right side with respect to the field of view of a passenger seated at the rear of the vehicle, said fourth light column making it possible to define, in combination with the second light column 12', a third artificial horizon line 14' on the right side of the vehicle.

By appropriately driving the light-emitting diodes of the first, second and third light columns 12, 12' and 12", it is thus possible to align the first and second artificial horizon lines 14, 16 in a horizontal plane A which is always perpendicular to the gravitation vector. Thus, a person seated next to a rear lateral window or a rear lateral door panel 13 and behind the front seat 15 and fixing said artificial horizon lines 14, 16 will have the same visual sensations as the driver looking at the road: he will therefore be no longer subject to motion sickness. As in the embodiment of FIG. 1, the drive of the light-emitting diodes is carried out by means of a triaxial accelerometer and a control unit able to receive the acceleration signals emitted by the accelerometer. The control unit can be a processor or computer equivalent including a memory configured to cause a processor to perform corresponding functions. The control unit can also control the height of the highest or lowest points of light, depending on a physical parameter linked to the person sitting in one of the rear seats. In particular, a sensor arranged inside the passenger compartment may be configured to detect at least one physical parameter, in particular the size or the position of the eyes, of the person seated on one of the rear seats and to transmit the information corresponding to the control unit. In response to the information transmitted by the sensor, the control unit is capable of modifying the height of the highest or lowest light point of each of the light columns so as to align it, for example with the position of the eyes of the person sitting in the back, which was previously detected by the sensor.

FIGS. 7 to 11, 7*a* to 11*a* and 7*b* to 11*b* illustrate several conditions of possible conduct and the corresponding operation of the anti-kinetosis device of the disclosure fitted to the vehicle.

Figure 7A:
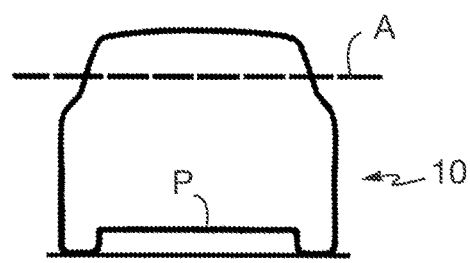
FIG. 7a is a rear view of the vehicle shown in FIG. 7.
Figure 7B:
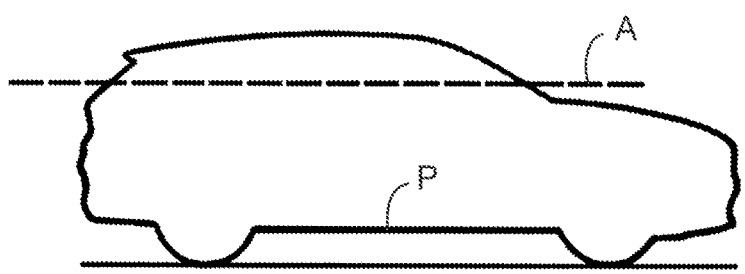
FIG. 7b is a lateral view of the vehicle shown in FIG. 7.

Thus, in the case where the vehicle 10 is traveling on a flat road, as represented in FIGS. 7*a* and 7*b*, it is in principle not subjected to any acceleration. In this case, the plane A defined by the artificial horizon lines 14, 16 is parallel to the floor pan P of the vehicle.

Figure 8:
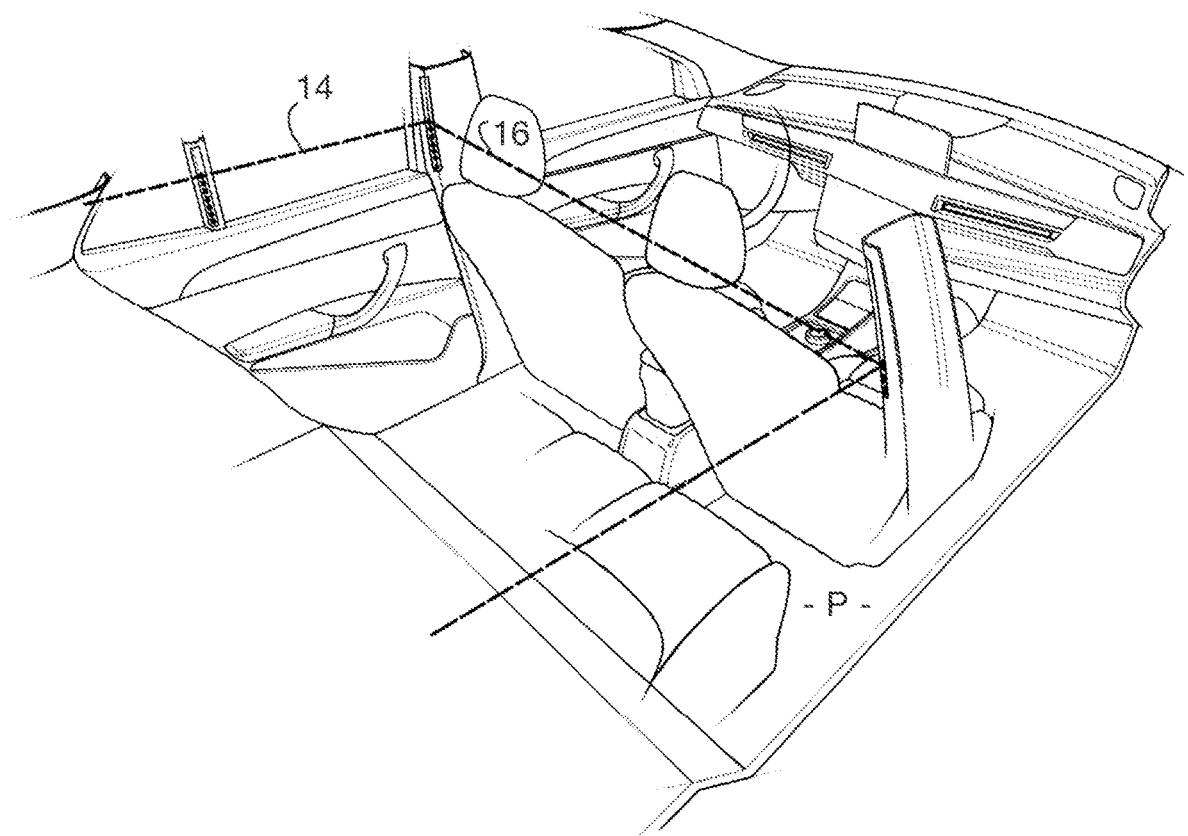
FIG. 8 is a view similar to FIG. 7, the vehicle being subjected to an acceleration along the Y axis.
Figure 8A:
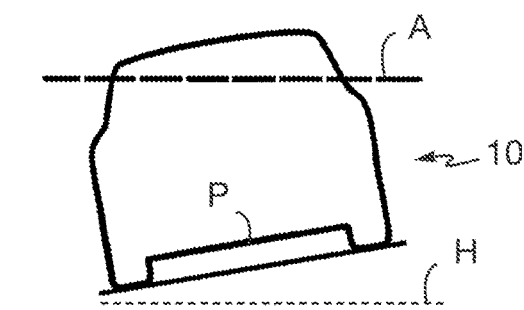
FIG. 8a is a rear view of the vehicle shown in FIG. 8.
Figure 8B:
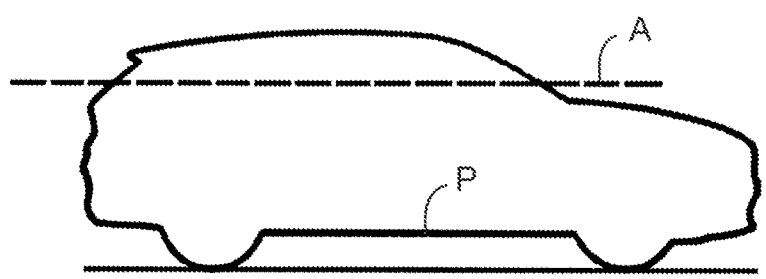
FIG. 8b is a lateral view of the vehicle shown in FIG. 8.

In the case where the vehicle 10 is traveling on a road inclined to the left with respect to a fixed horizontal plane H, perpendicular to the gravitation vector, as represented in FIGS. 8*a* and 8*b*, it is subjected to an acceleration along the Y axis. This acceleration is detected by the triaxial accelerometer, which sends a signal acceleration corresponding to the control unit. In response to this acceleration signal, the control unit controls the light-emitting diodes of the first, second and third light columns 12, 12', 12" so as to align the first and second artificial horizon lines 14, 16 with the fixed horizontal plane H. In this case, the plane A defined by the artificial horizon lines is inclined with respect to the floor pan P of the vehicle at the level of the Y axis, as shown in FIG. 8.

Figure 9:
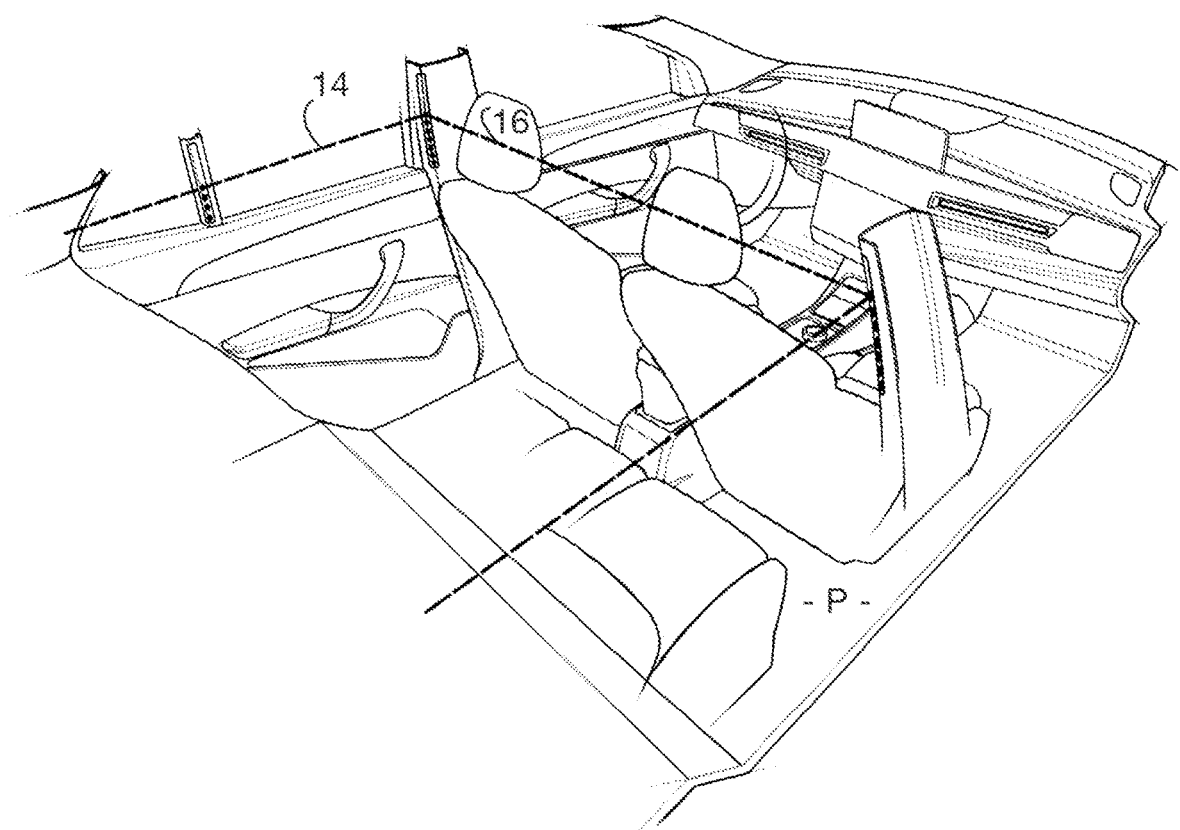
FIG. 9 is a view similar to FIG. 7, the vehicle being subjected to an acceleration along the X axis.
Figure 9A:
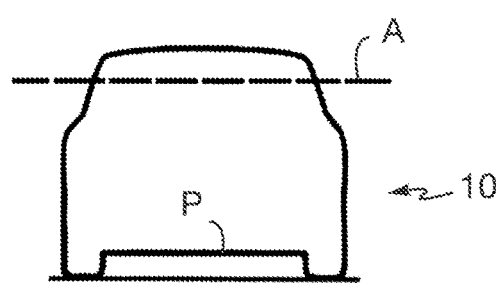
FIG. 9a is a rear view of the vehicle shown in FIG. 9.
Figure 9B:
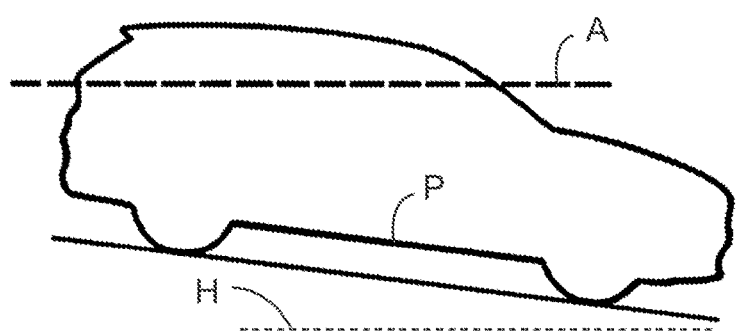
FIG. 9b is a lateral view of the vehicle shown in FIG. 9.

In the case where the vehicle 10 is traveling on a road inclined downwards with respect to a fixed horizontal plane H, perpendicular to the gravitation vector, as represented in FIGS. 9*a* and 9*b*, it is subjected to an acceleration along the X axis. This acceleration is detected by the triaxial accelerometer, which sends a corresponding acceleration signal to the control unit. In response to this acceleration signal, the control unit controls the corresponding light-emitting diodes of the first, second and third light columns 12, 12', 12" so as to align the first and second artificial horizon lines 14, 16 with the fixed horizontal plane H. In this case, the plane A defined by the artificial horizon lines is inclined with respect to the floor pan P of the vehicle at the level of the X axis, as shown in FIG. 9.

Figure 10:
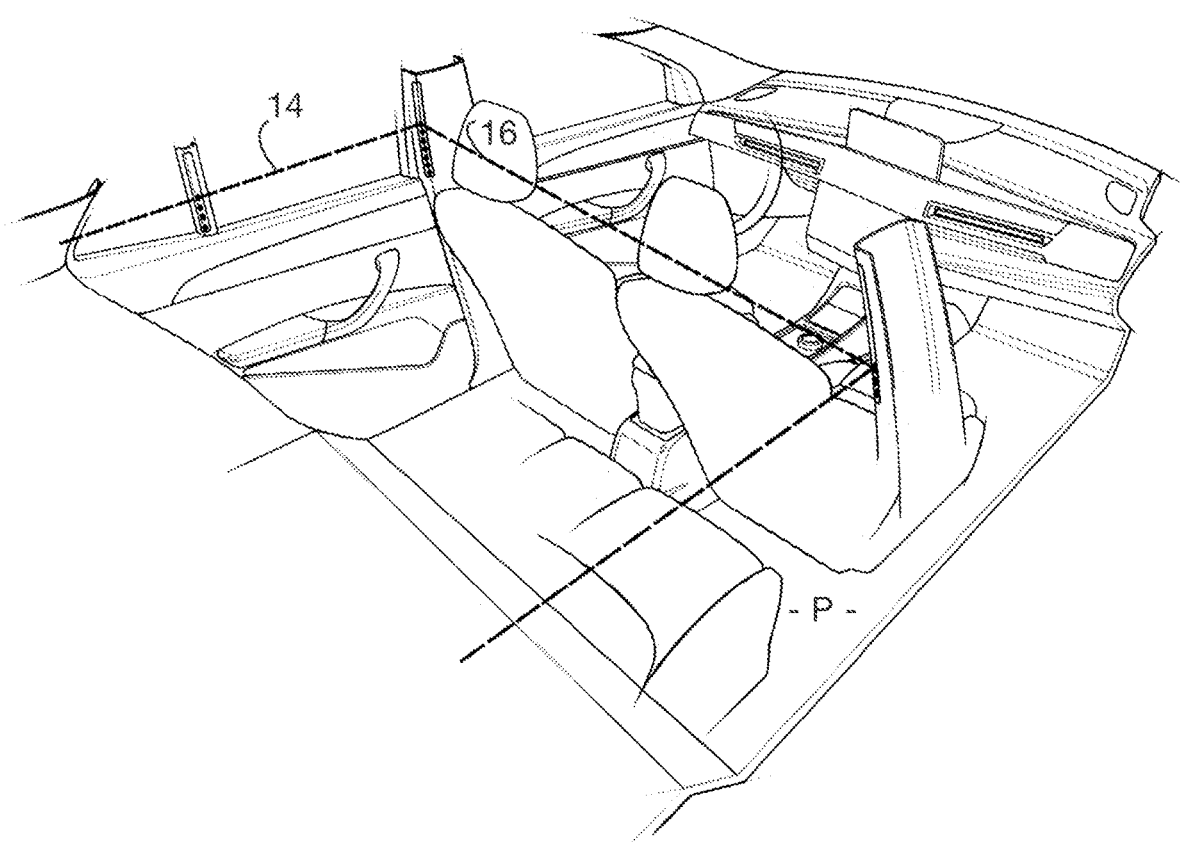
FIG. 10 is a view similar to FIG. 7, the vehicle being subjected to an acceleration along the X axis and along the Y axis.
Figure 10A:
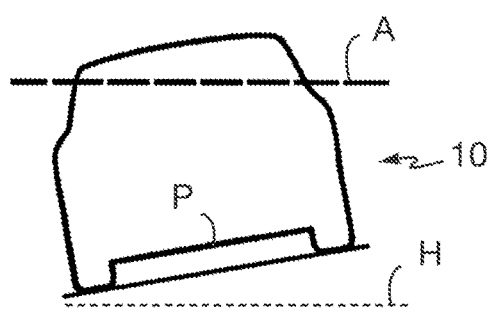
FIG. 10a is a rear view of the vehicle shown in FIG. 10.
Figure 10B:
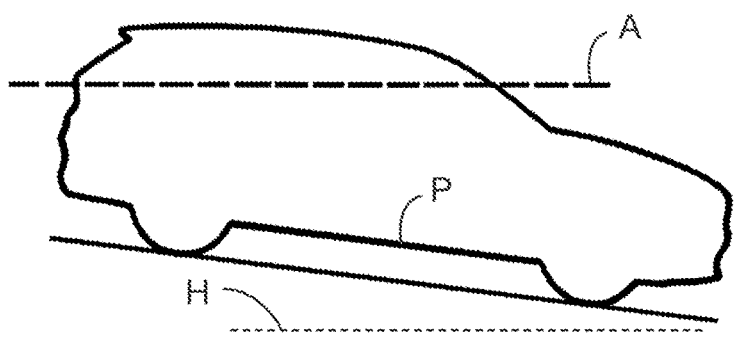
FIG. 10b is a lateral view of the vehicle shown in FIG. 10.

In the case where the vehicle 10 is traveling on a road inclined to the left and downwards with respect to a fixed horizontal plane H, perpendicular to the gravitation vector, as represented in FIGS. 10*a* and 10*b*, it is subjected to an acceleration according to the X axis and along the Y axis. This acceleration is detected by the triaxial accelerometer, which sends a corresponding acceleration signal to the control unit. In response to this acceleration signal, the control unit controls the corresponding light-emitting diodes of the first, second and third light columns 12, 12', 12" so as to align the first and second artificial horizon lines 14, 16 with the fixed horizontal plane H. In this case, the plane A defined by the artificial horizon lines is inclined with respect to the floor pan P of the vehicle at the level of the axes X and Y, as shown in FIG. 10.

Figure 11:
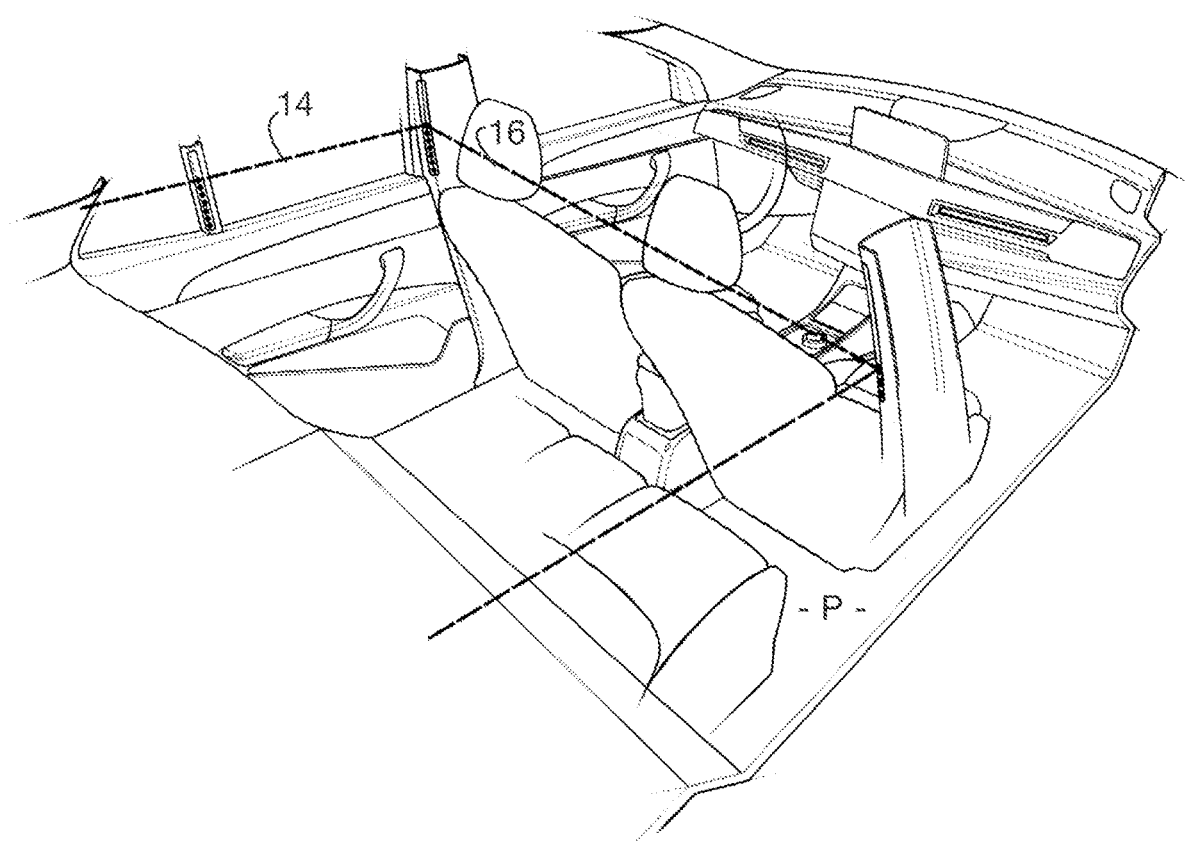
FIG. 11 is a view similar to FIG. 7, the vehicle being subjected to an acceleration along the Y axis.
Figure 11A:
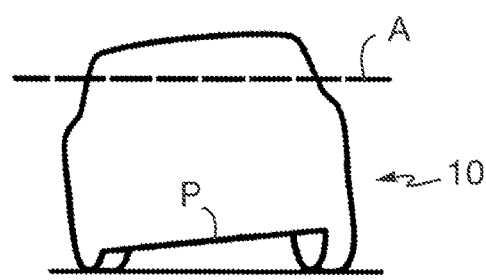
FIG. 11a is a rear view of the vehicle shown in FIG. 11.
Figure 11B:
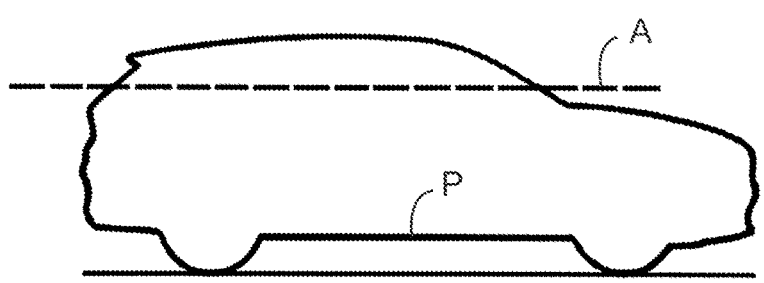
FIG. 11b is a lateral view of the vehicle shown in FIG. 11.

In the case where the vehicle 10 is traveling on a flat road and makes a left turn, as shown in FIGS. 11*a* and 11*b*, it is subjected to an acceleration along the Y axis. This acceleration is detected by the triaxial accelerometer, which sends a corresponding acceleration signal to the control unit. In response to this acceleration signal, the control unit controls the corresponding light-emitting diodes of the first, second and third light columns 12, 12', 12" so as to align the first and second artificial horizon lines 14, 16 with the fixed horizontal plane H. In this case, the plane A defined by the artificial horizon lines is inclined with respect to the floor pan P of the vehicle at the level of the Y axis, as shown in FIG. 11.

The two embodiments described above are obviously not limiting for the disclosure. Other embodiments could be envisaged at this level.

Moreover, the disclosure also aims to protect a method for displaying light markers intended to combat the kinetosis. This method may in particular comprise the following steps of:

detecting the accelerations of a motor vehicle along 3 axes, in particular by means of a triaxial accelerometer, and sending corresponding signals to a control unit;

detecting a physical parameter related to the person seated in the motor vehicle and sending a corresponding signal to the control unit;

driving by the control unit a means for displaying light markers capable of forming at least one first artificial horizon line at the level of a first internal surface of the motor vehicle and at least one second artificial horizon line at the level of a second internal surface of the motor vehicle, said first and second artificial horizon lines being perpendicular or substantially perpendicular to each other, such that the first and second artificial horizon lines are aligned in a horizontal plane, perpendicular to the gravitation vector, whatever the accelerations of the vehicle, the position of said horizontal plane along a direction parallel to the gravitation vector being able to vary according to the detected physical parameter.

The invention claimed is:

1. An anti-kinetosis device fitted to a motor vehicle, wherein the anti-kinetosis device comprises:

a triaxial accelerometer configured to detect accelerations of the vehicle along three axes and to emit a corresponding acceleration signal;

a display means for displaying a plurality of light markers capable of forming a first artificial horizon line at a level of a first internal surface of the motor vehicle and a second artificial horizon line at the level of a second internal surface of the motor vehicle, said first and second artificial horizon lines defining a first horizontal plane and being formed in a field of view of a first person seated in the motor vehicle, the display means including the plurality of light markers and being displaceable such that a physical height of the plurality of light markers is adjustable, the plurality of light markers being switchable between at least an illuminated and an unilluminated state;

a control unit comprising, an acceleration signal input, a processor and a memory, the control unit receiving the acceleration signals emitted by the triaxial accelerometer at the acceleration signal input and the memory storing instructions configured to cause the processor to align the first horizontal plane perpendicular to a gravitation vector by mechanically driving the means for displaying the plurality of light markers and to alter a physical height of one of a highest point of the plurality of light markers and a lowest point of the plurality of light markers to have a height relative to the gravitation vector equal to a height of a detected physical parameter of the first person seated in the motor vehicle; and wherein the first horizontal plane is aligned with a position of eyes of the first person seated in the motor vehicle.

2. The device according to claim 1, wherein the detected physical parameter is a height of the person, in a seated position in the vehicle.

3. The device according to claim 1, wherein the memory further stores instructions configured to cause the processor to modify a position of the first horizontal plane defined by the first and second artificial horizon lines in response to a command entered manually by an occupant of the vehicle, the command being entered vi a command interface.

4. The device according to claim 3, wherein the command interface is integrated into a dashboard of the vehicle.

5. The device according to claim 3, wherein the command interface is integrated in a central upright of the vehicle.

6. The device according to claim 4, wherein the command interface comprises an external surface functionally linked to a detection means of a capacitive type, said detection means being capable of detecting contact of a finger on said external surface and transmitting a corresponding signal to the control unit.

7. The device according to claim 1, wherein the memory stores instructions configured to cause the processor to automatically modify a position of the first horizontal plane in response to a signal emitted by a sensor configured to detect at least one physical parameter of the first person.

8. The device according to claim 7, wherein the sensor is selected from a group consisting of a camera, an ultrasound sensor, a radio frequency sensor and a weight measurement sensor positioned in a vehicle seat.

9. The device according to claim 1, wherein the display means are able to emit at least a first light beam and a second light beam, the first and second light beam being rectilinear shaped, the first light beam being projected on the first internal surface and forming the first artificial horizon line, and the second light beam being projected onto the second internal surface and forming the second artificial horizon line.

10. The device according to claim 9, wherein the display means comprise at least one light source emitting a main light beam, and a means for separating and deflecting said main light beam into the first light beam and the second light beam.

11. The device according to claim 10, wherein the means for separating and separating and deflection comprises a prism configured to separate the main light beam into the first light beam and the second light beam and a combination of at least one of mirrors and lenses configured to modify a path the first light beam and the second light beam.

12. The device according to claim 9, wherein the display means comprises at least one pair of light sources, and a first light source of the at least one pair of light sources emits the first light beam and a second light source of the at least one pair of light sources emits the second light beam.

13. The device according to claim 12, wherein the first light source of the at least one pair of light sources is a first laser and the second light source of the at least one pair of light sources is a second laser.

14. The device according to claim 1, wherein the display means comprises at least three light columns oriented vertically, the at least three light columns including a first light column arranged in alignment with the first internal surface and in alignment with the second internal surface, a second light column arranged in alignment with the second internal surface and to the left or to the right of the first light column, and a third light column arranged in alignment with the first internal surface and closer to the rear of the vehicle than the first light column, each column of the at least three light columns being formed of a plurality of vertically aligned light points, each light point of the plurality of vertically aligned light points being able to emit light in an activated state and not emit light in a deactivated state, and the first artificial horizon line is formed by a first virtual line passing through one of a highest activated light point of the first and third light column and a lowest activated light points on the first and third light column and the second artificial horizon line is formed by a second virtual line passing through one of the highest activated light point of the first and second light column and the lowest activated light point on the first and second light columns respectively.

15. The device according to claim 14, wherein each light column of the at least three light columns comprises a linear network of vertically aligned light-emitting diodes, each of the vertically aligned light-emitting diodes forming a light point.

16. The device according to claim 1, wherein the device is incorporated in a motor vehicle.

17. The device of claim 16, wherein the motor vehicle comprises at least one central upright supporting the display means, said display means being configured to project a first light beam onto one of a rear lateral window and a rear door panel of the vehicle and being configured to project a second light beam onto an internal surface of a passenger compartment, the internal surface being arranged perpendicular to said one of said rear lateral window and said rear door panel.

18. The device according to claim 17, wherein the display means is displaceable along the central upright and is configured to allow adjustment of a height of the first and second artificial horizon lines with respect to a fixed horizontal plane.

19. A method for displaying light markers intended to combat motion sickness, the method including the following steps:
   detecting accelerations of a motor vehicle along 3 axes,
   detecting a physical parameter of a person seated in the motor vehicle, and
   driving a display means for displaying light markers capable of forming at least one first artificial horizon line at a level of a first internal surface of the motor vehicle and at least one second artificial horizon line at a level of a second internal surface of the motor vehicle, said at least one first artificial horizon line and said at least one second artificial horizon line each defining a horizontal plane and being formed in a field of view of a first person seated in the motor vehicle, the horizontal plane being perpendicular to a gravitation vector, wherein a position along the gravitation vector of an intersection of said horizontal plane with the gravitation vector being aligned with the detected physical parameter of the person and aligned with a position of eyes of the first person seated in the motor vehicle;
   wherein the display means comprises at least three light columns oriented vertically, the at least three light columns including a first light column arranged in alignment with the first internal surface and in alignment with the second internal surface, a second light column arranged in alignment with the second internal surface and to the left or to the right of the first light column, and a third light column arranged in alignment with the first internal surface and closer to the rear of the vehicle than the first light column, each light column of the at least three light columns being formed of a plurality of vertically aligned light points, each light point of the plurality of vertically aligned light points being able to emit light in an activated state and not emit light in a deactivated state, and the at least one first artificial horizon line is formed by a first virtual line passing through one of a highest activated light point of the first and third light column and a lowest activated light points on the first and third light column and the at least one second artificial horizon line is formed by a second virtual line passing through one of the highest activated light point of the first and second light column and the lowest activated light point on the first and second light columns respectively;

selecting a height of the one of the highest light point of each of the at least three light columns and the lowest light point of each of the at least three light columns such that the height of the one of the highest light point and the lowest light point aligns with the detected physical parameter of the person, wherein the detected physical parameter is a detected height of the eyes of the first person; and mechanically displacing each of the at least three light columns such that the one of the highest activated light point and the lowest activated light point is at a physical height of the detected physical parameter of the first person.

20. The device according to claim 1, wherein the plurality of light markers includes a first set of light markers disposed on a first column and a second set of light markers disposed on a second column, the first set of light markers and the second set of light markers being independently displaceable such that a physical height of each of the first set of light markers and the second set of light markers is distinct, and wherein the first artificial horizon line is angled relative to the first internal surface of the motor vehicle.

* * * * *